United States Patent [19]
Kumano et al.

[11] Patent Number: 5,808,827
[45] Date of Patent: Sep. 15, 1998

[54] TAPE LOADING MECHANISM

[75] Inventors: Akira Kumano, Kanagawa; Tsukasa Sasabe, Tokyo, both of Japan

[73] Assignee: Sony Corporation, Tokyo, Japan

[21] Appl. No.: 552,928

[22] Filed: Nov. 3, 1995

[30] Foreign Application Priority Data

Nov. 9, 1994 [JP] Japan ..................... 6-275310

[51] Int. Cl.$^6$ ............................... G11B 15/665
[52] U.S. Cl. ............................. 360/85; 360/95
[58] Field of Search .................. 360/84, 85, 75, 360/96.5, 96.6, 130.22, 130.21, 130.23; 242/334, 346, 346.1, 346.2

[56] References Cited

U.S. PATENT DOCUMENTS

| 5,184,259 | 2/1993 | McNer et al. | 360/85 |
| 5,204,791 | 4/1993 | Konishi et al. | 360/85 |
| 5,231,551 | 7/1993 | Zaitsu et al. | 360/85 |
| 5,305,162 | 4/1994 | Kushiro et al. | 360/85 |
| 5,307,219 | 4/1994 | Haba | 360/85 |
| 5,363,256 | 11/1994 | Kobayashi | 360/85 |
| 5,445,337 | 8/1995 | Kwon | 360/85 |

FOREIGN PATENT DOCUMENTS

| 0 194 420 | 9/1986 | European Pat. Off. . |
| 0 329 345 | 8/1989 | European Pat. Off. . |
| 0 350 107 | 1/1990 | European Pat. Off. . |
| 0 405 779 | 1/1991 | European Pat. Off. . |
| 0 493 880 | 7/1992 | European Pat. Off. . |
| 9 100 840 | 12/1992 | Netherlands . |
| 88 09550 | 12/1988 | WIPO . |

*Primary Examiner*—John H. Wolff
*Assistant Examiner*—David L. Ometz
*Attorney, Agent, or Firm*—Ronald P. Kananen

[57] ABSTRACT

A tape loading mechanism can reduce a load imposed upon a tape by removing conventional inclined guides and reduce the number of assemblies necessary for forming a tape transport system. The tape transport system of the tape loading mechanism is composed of four guide members of a tension regulator guide (9) for supporting a tape unreeled from a supply reel (1), a guide post (12) having a shuttle for guiding the tape into the entrance side of a rotary drum (14), a guide post (13) having a shuttle for guiding the tape into the exit side of the rotary drum (14), and an exit guide (21) for guiding the tape into a take-up reel (3). The tension regulator guide (9) and the exit guide (21) are formed as inclined guides having flanges in order to twist the tape supported by the respective guides so that a tape transport direction and a tape height direction can be varied. Thus, the inclined guide member with the shuttle can be removed.

7 Claims, 3 Drawing Sheets

5,808,827

TAPE LOADING MECHANISM

BACKGROUND OF THE INVENTION

The present invention relates to a tape loading mechanism of a recording and reproducing apparatus such as a video cassette recorder (VCR), and particularly to a tape transport system for loading a tape on a rotary drum.

When a tape is loaded onto a rotary drum through a tape transport system of a VCR, the tape transport system needs inclined guide members in order to helically wind a tape on an inclined rotary surface of a rotary drum. The inclined guide members are generally supported together with guide posts on moving members (hereinafter referred to as shuttles) for loading the tape on the rotary drum. The shuttles are disposed on the entrance side and the exit side of the rotary drum, respectively.

The inclined guide members are used to change the tape transport direction and the tape transport height. The inclined guide members therefore require a large angle (inclination angle) at which the tape is allowed to be helically wound on the rotary drum.

However, if the wrapping angle of the inclined guide member increases, there is then the problem that a large load is imposed upon the tape wrapped around the inclined guide member as the tape is transported thereover. If a large load is imposed on the tape, then a tape recording surface can be damaged and a recording signal is influenced variously. Therefore, the moving tape should most preferably be protected from a large load.

SUMMARY OF THE INVENTION

In view of the aforesaid aspect, it is an object of the present invention to provide a tape loading mechanism in which a load imposed on a tape when the tape travels can be reduced considerably by removing the above mentioned type of inclined guide members.

It is another object of the present invention to provide a tape loading mechanism in which the number of assemblies forming a tape transport system can be lessened considerably.

It is a further object of the present invention to provide a tape loading mechanism which can be made inexpensively.

According to the present invention, there is provided a tape loading mechanism wherein a tape unreeled from a tape cassette is arranged to travel along a predetermined tape transport path and to be wound around a rotary drum. The tape loading mechanism includes a tape transport system composed of four guide members for supporting a tape which is unreeled from a supply reel, a guide post having a shuttle for guiding the tape into an entrance side of the rotary drum, a guide post having a shuttle for guiding the tape into an exit side of the rotary drum and an exit guide member for guiding the tape into a take-up reel. The tension regulator guide member and the exit guide member are flanged inclined guide members which twist the tape supported by the guide members, whereby the tape transport direction and the height of the tape can be varied as the tape is wrapped around the rotary drum.

DETAILED DESCRIPTION OF THE PREFERRED EMBODIMENT

A tape loading mechanism according to the present invention will be described with reference to the drawings, in which case the tape loading mechanism is applied to a VCR.

Figure 1:
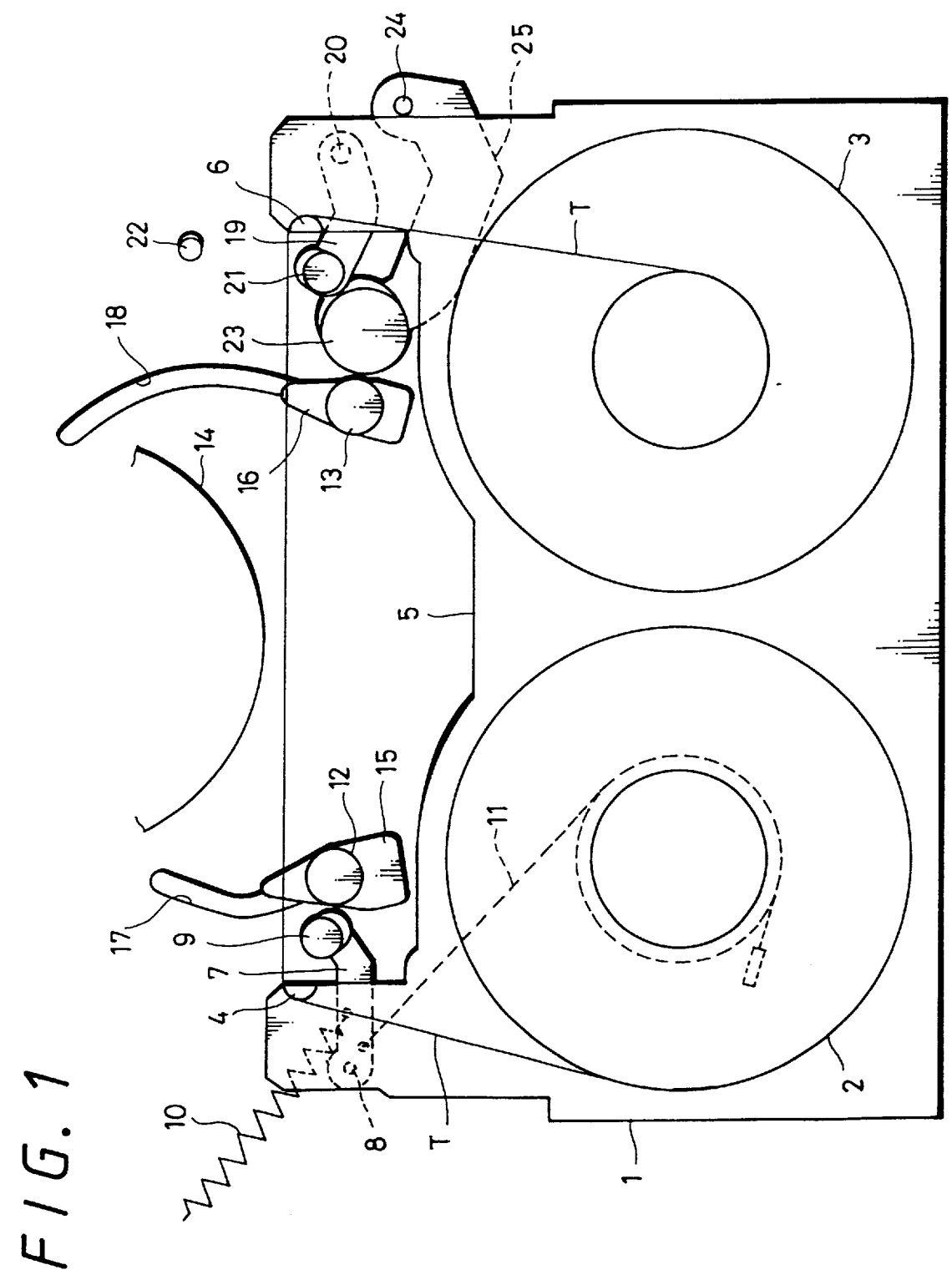
FIG. 1 is a plan view showing a tape loading mechanism according to the present invention wherein a tape is not wound on a rotary drum (unloading state)
Figure 2:
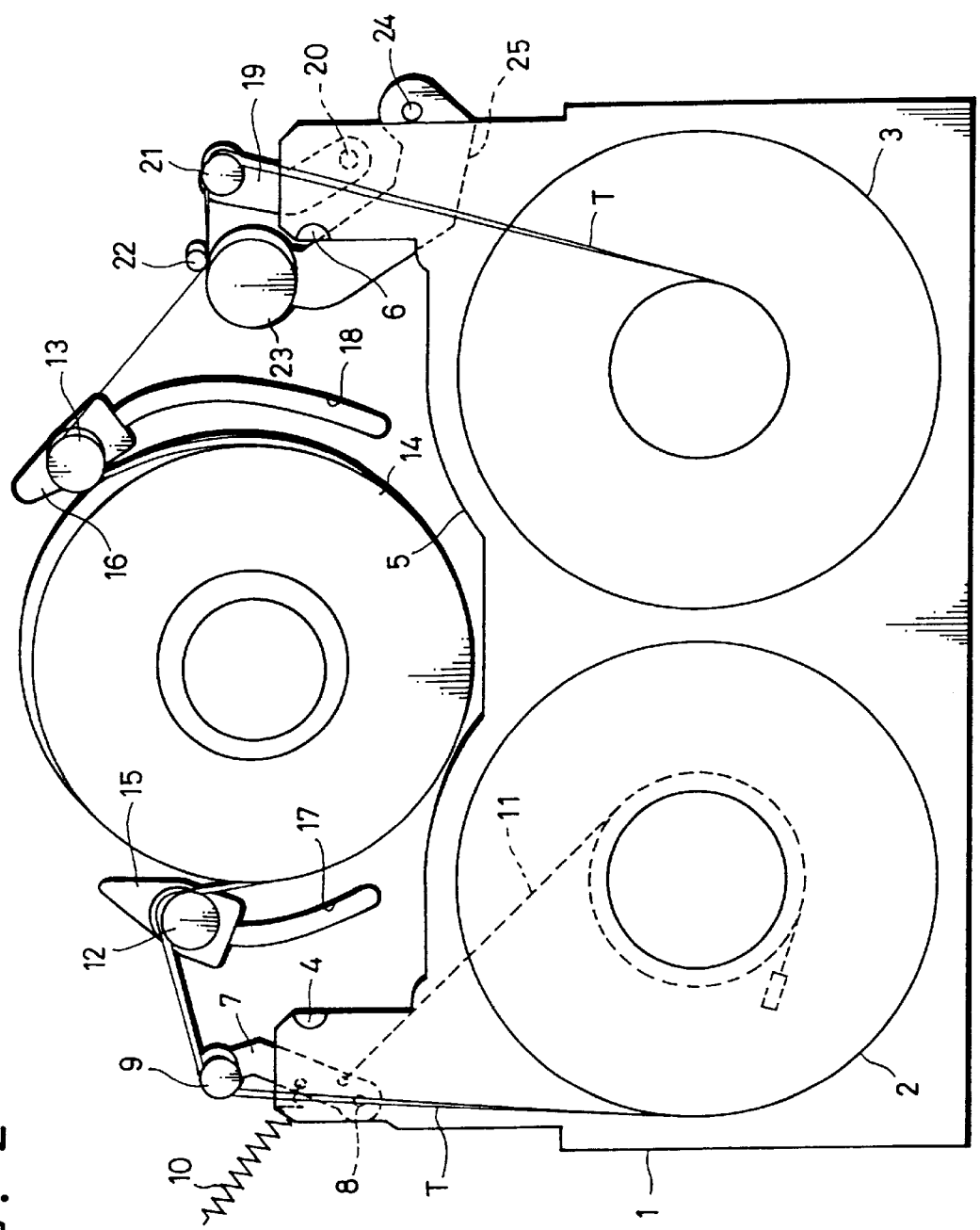
FIG. 2 is a plan view showing the tape loading mechanism according to the present invention wherein the tape is wound on the rotary drum (loading state)

FIG. 1 of the accompanying drawings is a plan view of a tape loading mechanism under the state that a tape is not yet wound on a rotary drum. FIG. 2 is a similar view showing the tape loading mechanism under the state that the tape is wound on the rotary drum.

A cassette housing, generally denoted at reference numeral 1 in FIG. 1, houses a supply reel 2 and a take-up reel 3 therein. A tape T that is unreeled from the supply reel 2 is transported through a tape guide member 4 and a mouth portion 5 and guided by a tape guide member 6, whereafter it is wound around the take-up reel 3.

The cassette housing 1 is loaded together with a slide member (not shown) onto a recording and reproducing apparatus (not shown). A tension regulator arm 7 is rotatable about a supporting point 8 on the slide member (not shown) disposed near the supply reel 2. A tension regulator guide member 9 is attached to the tip end of the tension regulator arm 7.

Figure 3:
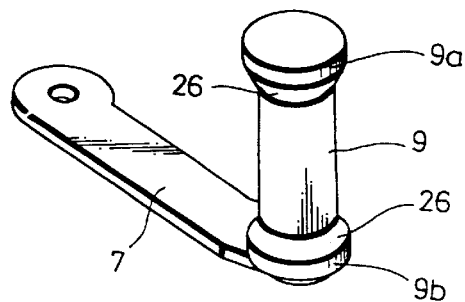
FIG. 3 is a perspective view showing a tension regulator guide member used in the present invention.

As shown in FIG. 3, the tension regulator guide member 9 comprises flanges 9a, 9b which are formed on the upper and lower portions of the surface on which the tape T travels. The tension regulator guide member 9 is formed as an inclined guide member that can be wholly inclined outwardly relative to the reel shaft of the supply reel 2. The tension regulator arm 7 with the tension guide member 9 attached thereto has a tension regulator spring 10 and a tension regulator belt 11 to apply a predetermined tape tension to the tape T as shown in FIG. 1.

Guide poles 12, 13 are vertically attached to moving members (referred to as shuttles) 15, 16 and can be moved along guide slots 17, 18. The guide poles 12, 13 are used to wind the tape T around a rotary drum 14. These guide poles 12, 13 are different from conventional guide poles which are composed of guide poles and inclined guide members supported on the shuttles.

A guide arm 19 is rotatable about a supporting point 20 on a slide member (not shown) disposed near the take-up reel 3. An exit guide member (reverse guide member) 21 is attached to the tip end of the guide arm 19.

Figure 4:
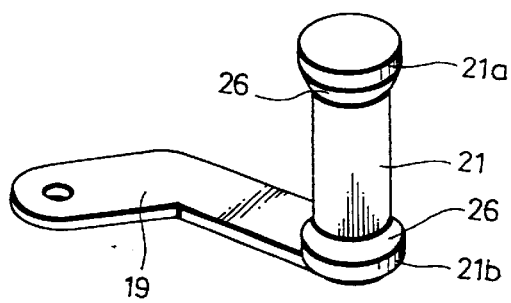
FIG. 4 is a perspective view showing an exit guide member used in the present invention.

As shown in FIG. 4, the exit guide member 21 is composed of flanges 21a, 21b which are formed on the upper and lower portions of the tape travel surface thereof. The exit guide member 21 is formed as an inclined member which is wholly inclined toward the rotary drum 14 relative to the reel shaft of the take-up reel 3.

Reference numeral 22 denotes a capstan and 23 a pinch roller. The pinch roller 23 is attached to a pinch roller arm 25 which is rotatable about a support shaft 24.

The tape loading mechanism placed at the tape unloading position shown in FIG. 1 is placed in the tape loading shown in FIG. 2. Specifically, as shown in FIG. 2, the tape T unreeled from the supply reel 2 is supported at the tension regulator guide member 9, guided by the guide pole 12 of the shuttle 15 and wound on the rotary drum 14. Then, the tape T is guided by the guide pole 13 of another shuttle 16 and the capstan 22 and then wound around the take-up reel 3 from the exit guide member 21. In other words, the transport system for the tape T comprises four guide members, i.e., the tension regulator guide member 9, the guide poles 12, 13 and the exit guide member 21.

Since the tension regulator guide member 9 is inclined, the tape T unreeled from the supply reel 2 is twisted by the tension regulator guide member 9. Specifically, the tape T is changed in both transport direction and height direction between the supply reel 2 and the tension regulator guide member 9. Further, the tape T is changed in both transport direction and height direction between the tension regulator guide member 9 and the guide pole 12. Therefore, the tape T that has been twisted by the tension regulator guide member 9 and vertically guided along the guide pole 12 can be reliably helically wrapped around an entrance-side inclined drum surface of the rotary drum 14.

An inclination angle of the tension regulator guide member 9 is selected such that the tape T supported by the tension regulator guide member 9 is lifted out of contact with the tape guide member 4 of the cassette housing 1 and a cassette housing portion opposing the tape guide member 4 under the tape loading state shown in FIG. 2.

The tape T that has been vertically unreeled from the exit-side inclined drum surface of the rotary drum 14 along the guide pole 13 is pinched by the capstan 22 and the pinch roller 23. Then, the tape T is twisted by the exit guide member 21 formed of the inclined guide member. Specifically, the tape T withdrawn from the guide member 21 is changed both in transport direction and height direction and wound around the take-up reel 3 while it is not applied with a load generated when it is wound around the take-up reel 3.

An inclination angle of the guide member 21 is selected such that the tape T supported by the guide 21 may not contact with the tape guide member 6 of the cassette housing 1 and a cassette housing portion opposed the tape guide member 6 under the tape loading state shown in FIG. 2.

According to the tape loading mechanism of the present invention, since the tension regulator guide member 9 and the guide member 21 are formed of the inclined guide members to respectively twist the tape T, the inclined guide members on the shuttles can be removed unlike the prior art. Thus, the tape transport system is composed of four guide members and can be simplified in arrangement. As a consequence, the number of assemblies forming the tape transport system can be lessened considerably and the tape loading mechanism can be made inexpensive.

Since the tape loading mechanism according to the present invention can remove the conventional inclined guide members, a load imposed on the tape when the tape travels can be reduced. Therefore, it is possible to remove a variety of influences exerted upon a recording signal when a tape recording surface is damaged.

The tension regular guide member 9 and the exit guide member 21 may be of either the rotary or fixed type. If the tension regulator guide member 9 is of the fixed type, then the tape transport direction and the tape height direction can be varied reliably.

Figure 5:
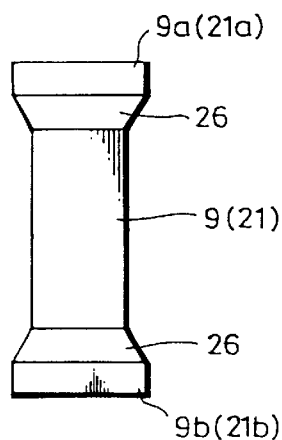
FIG. 5 is a front view showing the guide member shown in FIG. 3.
Figure 6:
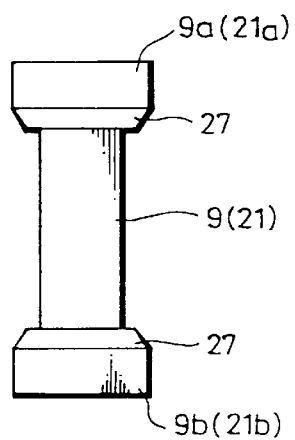
FIG. 6 is a front view showing a modified example of a guide member according to the present invention.

If tapered surfaces 26, 26 are formed on the flanges of the tension regulator guide member 9 and the exit guide member 21 as shown in FIG. 5, then the tape can be prevented from being detached from the tension regulator guide member 9 and the exit guide member 21. Moreover, the tape edge can be avoided from being damaged. Alternatively, tapered surfaces 27, 27 are formed on the tension regulator guide member 9 and the exit guide member 21 so as to form step differences relative to the tape transport surface, when necessary, as shown in FIG. 6.

While the tape loading mechanism of the VCR has been described so far, a fundamental principle of the present invention can also be widely applied to tape loading mechanisms of other recording and reproducing apparatus.

As described above, according to the tape loading mechanism of the present invention, since the tape transport system comprises the four guide members of the tension regulator guide member for supporting the tape unreeled from the supply reel, the guide post having the shuttle for guiding the tape into the entrance side of the rotary drum, the guide post having the shuttle for guiding the tape into the exit side of the rotary drum and the exit guide member for guiding the tape into the take-up reel and the tension regulator guide member and the exit guide member are formed as the inclined guide members to respectively twist the tape, the conventional inclined guide members can be removed. Therefore, the number of assemblies of the tape transport system can be reduced considerably and the tape loading mechanism can be made inexpensive.

According to the present invention, since the conventional inclined guide members are removed, the load imposed on the tape when the tape travels can be reduced. Therefore, the tape recording surface can be prevented from being damaged and thus the recording signal can be protected from a variety of influences occurred when the tape recording surface is damaged.

Further, according to the present invention, since the tension regulator guide member and the exit guide member are of the fixed type, the tape transport direction and the tape height direction can be varied reliably.

Furthermore, according to the present invention, since the flanges of the tension regulator guide member and the exit guide member are formed on the tapered surfaces, the tape can be prevented from being detached from the tension regulator guide member and the exit guide member. Moreover, the tape edge can be avoided from being damaged.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A tape loading mechanism wherein a tape from a tape cassette is guided along a predetermined tape transport path and wound around a rotary drum, said tape loading mechanism comprising a tape transport system, said tape transport system comprising:

a first guide post mounted on a first shuttle for guiding said tape into an entrance side of said rotary drum;

a second guide post mounted on a second shuttle for guiding said tape from an exit side of said rotary drum;

an inclined tension regulator guide member for supporting the tape which is unreeled from a supply reel and supplied directly from the supply reel to the tension regulator guide member, said tension regulator guide member being mounted on a pivotal tension regulator arm which is operatively connected with the supply reel for tape tension control, said tension regulator guide member being arranged so that the tape which passes over said tension regulator guide member extends directly and undeflectedly to said first guide post, said tension regulator guide member having a lower end connected to the pivotal tension regulator arm, and an upper end, said tension regulator guide member having a first tapered flange portion at the lower end for engaging and guiding the tape and a second tapered flange portion at the upper end for engaging and guiding the tape; and an inclined exit guide member for guiding said tape into a take-up reel, said exit guide member being supported on a pivotal guide arm and arranged with respect to the take-up reel so that the tape extends directly and undeflectedly to the take-up reel, said exit guide member having a lower end connected to the pivotal guide arm and an upper end, the exit guide member having a third tapered flange portion at the lower end for engaging and guiding the tape and a fourth flange for engaging and guiding the tape, whereby a tape transport direction and a tape height direction can be varied and said tape can be wrapped around said rotary drum.

2. A tape loading mechanism according to claim 1, wherein said tension regulator guide member and said exit guide member are fixed and non-rotatable with respect to the tension regulator arm and the guide arm, respectively.

3. A tape loading mechanism according to claim 1, wherein said tension regulator guide member and said exit guide member are rotatable with respect to the tension regulator arm and the guide arm.

4. A tape loading mechanism according to claim 1, wherein an inclination of said tension regulator guide member is selected such that said tape supported by said tension regulator guide member does not contact with a tape guide member forming a part of said tape cassette and a cassette housing portion opposed to said tape guide member.

5. A tape loading mechanism according to claim 1, wherein an inclination of said exit guide member is selected such that said tape supported by said exit guide member does not contact with a tape guide member of said tape cassette and a cassette housing portion opposed to said tape guide member.

6. A tape loading mechanism according to claim 1, wherein a step is respectively formed between each of the first, second, third and fourth tapered portions and an essentially cylindrical tape transport surface of each of said tension regulator guide member and said exit guide member.

7. A tape loading mechanism comprising:

a first non-inclined guide post mounted on a first shuttle which is movable about a rotary drum for guiding said tape into an entrance side of the rotary drum;

a second non-inclined guide post mounted on a second shuttle which is movable about the rotary drum for guiding said tape from an exit side of said rotary drum;

an inclined tension regulator guide member for supporting the tape which is unreeled from a supply reel and supplied directly from the supply reel to the tension regulator guide member, said tension regulator guide member forming part of a tension control means which is responsive to the rotation of the supply reel, said tension regulator guide member being arranged so that the tape which passes over said tension regulator guide member extends directly and undeflectedly to said first guide post, said tension regulator guide member having a lower end connected to a pivotal tension regulator arm, and an upper end, said tension regulator guide member having a first tapered flange portion at the lower end for engaging and guiding the tape and a second tapered flange portion at the upper end for engaging and guiding the tape and for changing a tape transport direction and a tape height direction as the tape is supplied to the rotary drum; and an inclined exit guide member for guiding said tape into a take-up reel, said exit guide member being supported on a pivotal guide arm and arranged with respect to the take-up reel so that the tape extends directly and undeflectedly to the take-up reel, said exit guide member having a lower end connected to the pivotal guide arm and an upper end, the exit guide member having a third tapered flange portion at the lower end for engaging and guiding the tape and a fourth flange for engaging and guiding the tape as it is supplied to the take-up reel.

* * * * *